United States Patent
Shinde et al.

(10) Patent No.: US 11,314,680 B1
(45) Date of Patent: Apr. 26, 2022

(54) CIRCUIT IMPLEMENTATION IN RESOURCE CONSTRAINED SYSTEMS

(71) Applicant: Raytheon Company, Waltham, MA (US)

(72) Inventors: Hrishikesh Shinde, Dallas, TX (US); Daryl Coleman, McKinney, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/066,542

(22) Filed: Oct. 9, 2020

(51) Int. Cl.
*G06F 13/42* (2006.01)

(52) U.S. Cl.
CPC ...... *G06F 13/4204* (2013.01); *G06F 13/4282* (2013.01); *G06F 2213/0002* (2013.01); *G06F 2213/0004* (2013.01)

(58) Field of Classification Search
CPC ............. G06F 13/4204; G06F 13/4282; G06F 2213/0002; G06F 2213/0004
See application file for complete search history.

(56) References Cited

U.S. PATENT DOCUMENTS

| | | | | |
|---|---|---|---|---|
| 6,011,407 A | * | 1/2000 | New | H03K 19/17732 326/39 |
| 6,034,542 A | * | 3/2000 | Ridgeway | H03K 19/177 326/38 |
| 6,418,494 B1 | | 7/2002 | Shatas et al. | |
| 9,294,097 B1 | * | 3/2016 | Vassiliev | G06F 30/34 |
| 2005/0044439 A1 | * | 2/2005 | Shatas | G06F 13/14 713/400 |
| 2018/0095774 A1 | * | 4/2018 | Atta et al. | G06F 9/45558 |
| 2019/0383873 A1 | * | 12/2019 | Hojabri | G01R 31/3187 |

OTHER PUBLICATIONS

Wikipedia, "VXS;" Retrieved from https://en.wikipedia.org/wiki/VXS; Last updated on Apr. 11, 2020; 1 Page.
Cicuttin, "Introduction to the WISHBONE Bus Interface;" PowerPoint Presentation Taken from the WISHBONE SoC Architecture Specification, Revision B.3; ICTP Latin-American Advanced Course of FPGADesign for Scientific Instrumentation; Nov. 12, 2012-Dec. 7, 2012; 30 Pages.
Daniluk et al., "Solving Vendor Lock-In in VME Single Board Computers Through Open-Sourcing of the PCIE-VME64X Bridge;" Proceedings of the 16th International Conference on Accelerator and Large Experimental Control Systems; Oct. 13, 2017; 6 Pages.
PCT International Search Report and Written Opinion dated Nov. 18, 2021 for International Application No. PCT/US2021/043329; 18 Pages.

* cited by examiner

*Primary Examiner* — Glenn A. Auve
(74) *Attorney, Agent, or Firm* — Daly Crowley Mofford & Durkee, LLP (57) ABSTRACT

Methods and apparatus for implementing a bus in a resource constrained system. In embodiments, a first FPGA is to a parallel bus and a second FPGA is connected to the first FPGA via a serial interface but not the parallel bus. The first FPGA processes a transaction request, which has a parallel bus protocol format, to the second FPGA by an initiator and converts the transaction request to the second FPGA into a transaction on the serial interface between the first and second FPGAs. The first FPGA responds to the initiator via the parallel bus indicating that the transaction request in the format for the parallel bus to the second FPGA is complete.

14 Claims, 6 Drawing Sheets

CIRCUIT IMPLEMENTATION IN RESOURCE CONSTRAINED SYSTEMS

STATEMENT REGARDING FEDERALLY SPONSORED RESEARCH

This invention was made with Government support under N00019-19-F-0270 awarded by the Department of Defense. The Government may have certain rights in the invention.

FIELD OF THE DISCLOSURE

The present disclosure relates to circuit implementations, and more particularly, to circuit implementations having resource constraints.

BACKGROUND

As is known in the art, systems are architected based on currently available integrated circuits, development systems, standards, such as bus standards, and the like. Software, firmware, etc., are developed at significant time and cost. However, over time available circuit components, development systems, etc., may change over time. If certain components, such as Field Programmable Gate Arrays (FPGAs) are no longer available, legacy systems may become inoperable. In addition, if a legacy system is redesigned or updated, such as to increase performance, e.g., throughput, response time, functionality, etc., the redesign must account for changes in available components and programming tools.

In some legacy systems, application software is designed for a given architecture. If an addressing scheme, components attached to a given bus, etc., change due to a redesign, components in the redesigned system may not be able to communicate without significant cost and development time. For example, resource limitations may prevent parallel bus, such as a VME bus, communication between multiple FPGAs in a system. Maintaining legacy system operability may require a change in the FPGA architecture or application programming, which is costly and time consuming, or a change to the interface, which may not be possible due to required interface specifications to legacy backend components.

SUMMARY

Embodiments of the disclosure provide methods and apparatus for enhancing reuse of legacy system application software, firmware, components, and the like, in a redesign of the legacy system. For example, a legacy system may include a FPGA with a high number of IO pins that facilitate communications over parallel bus implementations, such as a VME bus. A redesign of the legacy system may include first and second FPGAs that replace the legacy FPGA. In addition, the redesign first and second FPGAs may have fewer IOs but available high speed serial interface functionality. The redesign may include a direct bus connection to the first FPGA and a connection to the second FPGA via the first FPGA without the need to change legacy application software for transactions with the second FPGA, which is no longer connected to the bus. Using FPGA-to-FPGA high-speed serial interfaces, a legacy bus, e.g., VME, can be implemented in the redesign partly with a bus interface to the first FPGA and partly in a serial interface between the first and second FPGAs without significant loss, if any, in throughput. Embodiments of the disclosure do not change the bus protocol or the clock speeds so the backend can continue using the legacy bus protocol, e.g., VME. Embodiments of the disclosure provide the ability to continue using a legacy bus protocol as an internal bus on resource constrained systems while maintaining with minimum overhead for bus communication.

In one aspect, a method comprises: connecting a first FPGA to a parallel bus; connecting a second FPGA to the first FPGA via a serial interface, wherein the second FPGA is not connected to the parallel bus; processing, by the first FPGA, a transaction request to the second FPGA by an initiator, wherein the transaction request has a format in a protocol for the parallel bus; converting the transaction request to the second FPGA into a transaction on the serial interface between the first and second FPGAs; and responding, by the first FPGA, to the initiator via the parallel bus indicating that the transaction request in the format for the parallel bus to the second FPGA is complete.

The method can further include one or more of the following features: the initiator comprises a legacy application, the first and second FPGAs are partitioned from a legacy FPGA, the legacy FPGA was configured to connect with the parallel bus, processing, by the first FPGA, the transaction request comprises decoding address information on the parallel data bus, converting the transaction request to the second FPGA into the transaction on the serial interface between the first and second FPGAs comprises: the first FPGA sending a transmit request signal; the second FPGA sending a receive indicator signal; the second FPGA transmitting an acknowledgment signal; and the first FPGA sending a receive indicator signal, and/or the processing and the converting of the transaction request are performed in a processing state of the parallel bus protocol.

In another aspect, a system comprises: a first FPGA connected to a parallel bus; a second FPGA connected to the first FPGA via a serial interface, wherein the second FPGA is not connected to the parallel bus; wherein the first FPGA is configured to process a transaction request to the second FPGA by an initiator, wherein the transaction request has a format in a protocol for the parallel bus, wherein the first and second FPGAs are configured to convert the transaction request to the second FPGA into a transaction on the serial interface between the first and second FPGAs, and wherein the first FPGA is further configured to respond to the initiator via the parallel bus indicating that the transaction request in the format for the parallel bus to the second FPGA is complete.

The system can further include one or more of the following features: the initiator comprises a legacy application, the first and second FPGAs are partitioned from a legacy FPGA, the legacy FPGA was configured to connect with the parallel bus, processing the transaction request comprises decoding address information on the parallel data bus, converting the transaction request to the second FPGA into the transaction on the serial interface between the first and second FPGAs comprises: the first FPGA sending a transmit request signal; the second FPGA sending a receive indicator signal; the second FPGA transmitting an acknowledgment signal; and the first FPGA sending a receive indicator signal, and/or the processing and the converting of the transaction request are performed in a processing state of the parallel bus protocol.

BRIEF DESCRIPTION OF THE DRAWINGS

The foregoing features of this disclosure, as well as the technical concept(s), may be more fully understood from the following description of the drawings in which.

DETAILED DESCRIPTION

Figure 1:
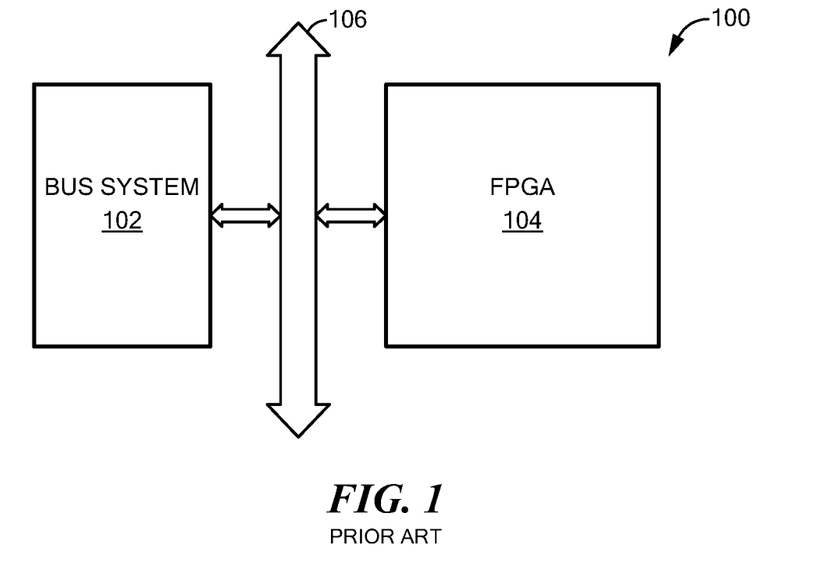
FIG. 1 is a block diagram of a prior art system including a parallel bus and a legacy FPGA.

FIG. 1 shows a prior art legacy system 100 having a bus controller 102 and a circuit component 104 shown as a Field Programmable Gate Array (FPGA) connected to a parallel bus 106 with data, address, and control signals well known to those of ordinary skill in the art. Components connected to the bus 106 can communicate with each other under the control of the bus controller 102. For example, a circuit card (not shown) having a processor and memory may be programmed using software to implement an addressing and data scheme for communicating with the FPGA 104 using the protocol for the parallel bus 106.

Example bus implementations include VME, PCI, Compact PCI (cPCI), Multibus or any parallel processor bus (e.g. PowerPC 60x/MPx).

As used herein, the term legacy refers to an existing system that can include legacy circuit components, such as FPGA components that may or may not be currently available, legacy programming of the legacy FPGA components, legacy firmware, legacy software, legacy application programming, and the like. The term redesign system refers to a system based on a legacy system for which reuse of the above legacy items is desirable so that development time and cost of the redesign is minimized or reduced.

Figure 2:
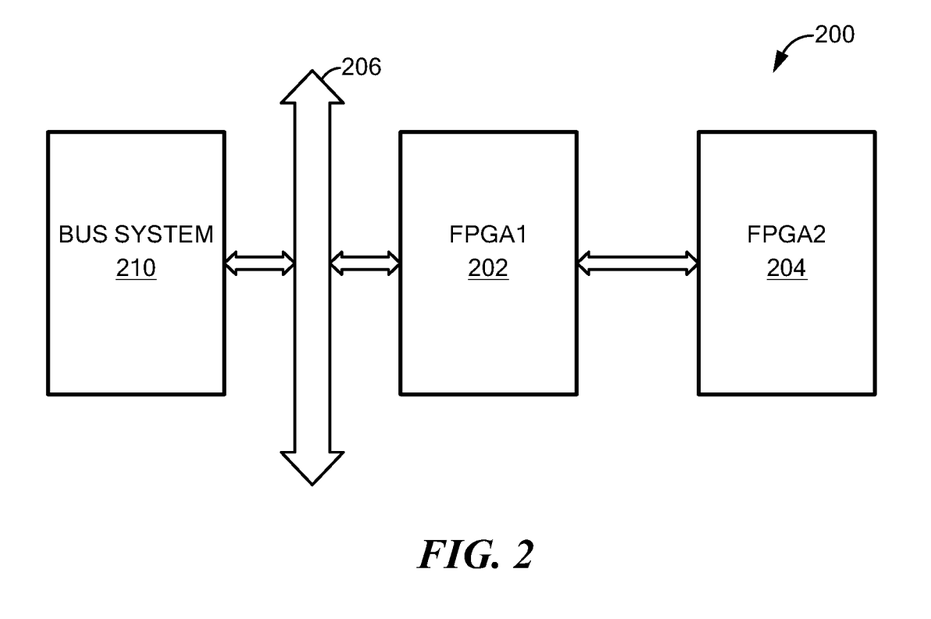
FIG. 2 is a block diagram of a system redesign of the system of FIG. 1 having first and second FPGAs partitioned from the legacy FPGA of FIG. 1.

FIG. 2 shows an example redesign 200 of the legacy system 100 of FIG. 1 in which FPGA 104 functionality is partitioned between first and second FPGAs 202, 204. The first FPGA 202 is connected to a parallel bus 206 while the second FPGA 204 is not connected to the bus 206. The first and second FPGAs 202, 204 are connected via a serial interface 208. A bus controller 210 can also be connected to the bus 206.

At present, many FPGAs provide high-speed serial interfaces with fewer external IO connections than in past versions of FPGAs. Since fewer external IO connections are available, it may not be possible to implement many bus connections which are relatively wide with parallel address and data connections. That is, newer FPGA configurations focus on high-speed serial lines and devices are weighted heavier on internal resources than IO connections. This may create implementation issues when trying to implement legacy parallel busses. Resource limitations, e.g., IO limitations, may prevent bus communication between multiple FPGAs in a system. As described more fully below, in example embodiments, a bus interface, such as a VME bus, is implemented in a high speed serial FPGA-to-FPGA interface. In embodiments, a serial interface may require only two communication wires, though more may be used.

For example, about 60-76 parallel lines for a bus implementation can be consolidated into two pairs of serial lines, e.g., transmit and receive.

It is understood that the number of legacy FPGAs and the number of FPGAs in a redesign can vary. While example embodiments show one legacy FPGA partitioned into first and second new FPGAs, more than one legacy FPGA can be partitioned into multiple new FPGAs some of which are connected to a legacy bus and serial interfaces to meet the needs of a particular application. It is also understood that the number and type of wide legacy parallel buses can vary with more than one bus or a combination of more than one type of legacy bus. For example, FPGA 202 could be connected to more than one parallel bus of the same type or of different types that can provide transparent serial connectivity to more than one FPGA component.

While embodiments of the disclosure are shown and described in conjunction with certain bus protocols, such as VME, example FPGA types, such as those manufactured by XILINX, and example serial interfaces such as GTX, it is understood that embodiments of the disclosure are applicable to any practical bus protocol, FPGA type, and FPGA interface, that can be selected to meet the needs of a particular application. Any reference to a particular FPGA or bus characteristic is intended to convey and understanding of the disclosure and should not be considered limiting in any way.

Figure 3:
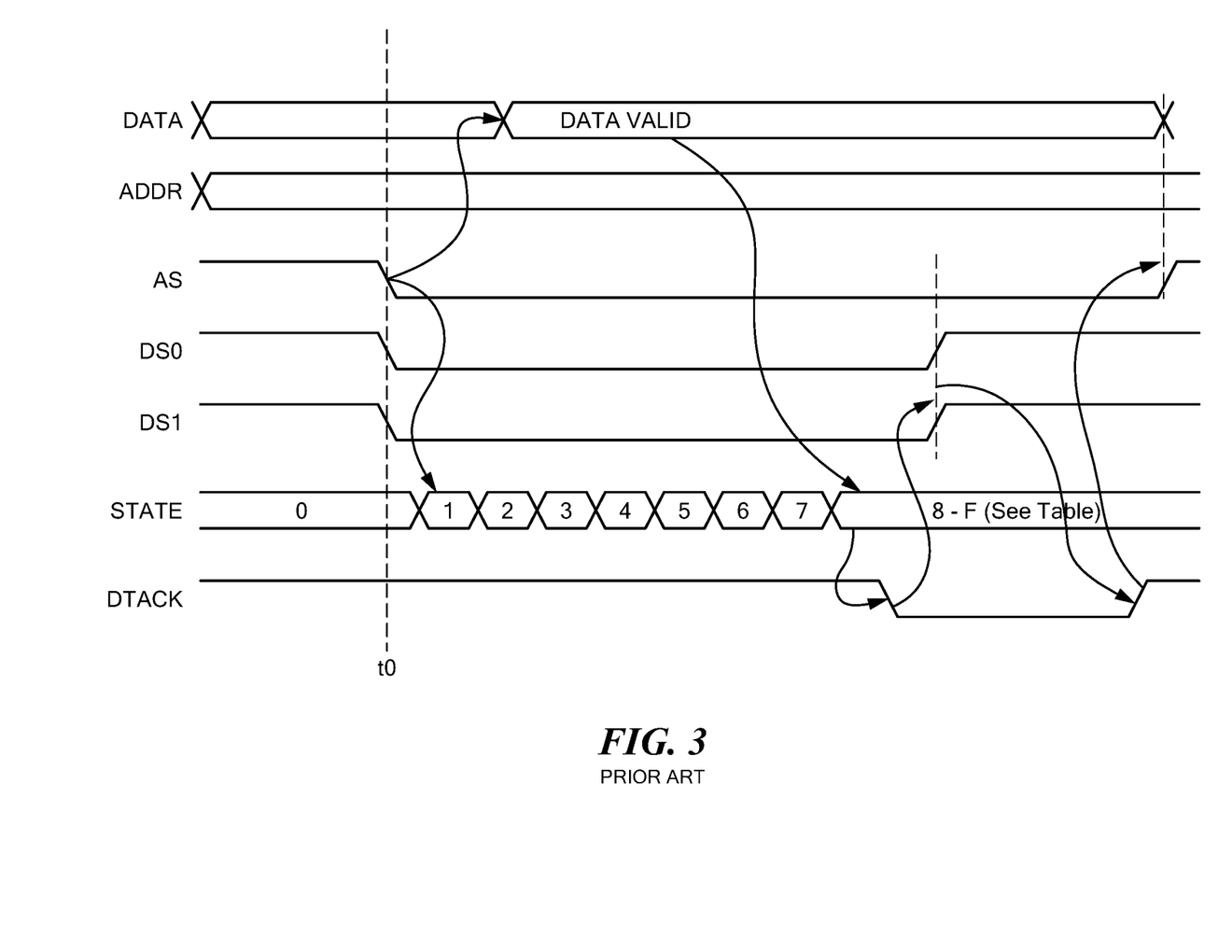
FIG. 3 is a timing diagram for a prior art VME transaction.

FIG. 3 shows a timing diagram for a prior art VME bus protocol implementation. At time t0, an address strobe AS transitions after which data becomes valid. Data strobe signals D0, D1 also transition. When data transfer is complete an acknowledge signal DTACK can be sent.

Figure 4:
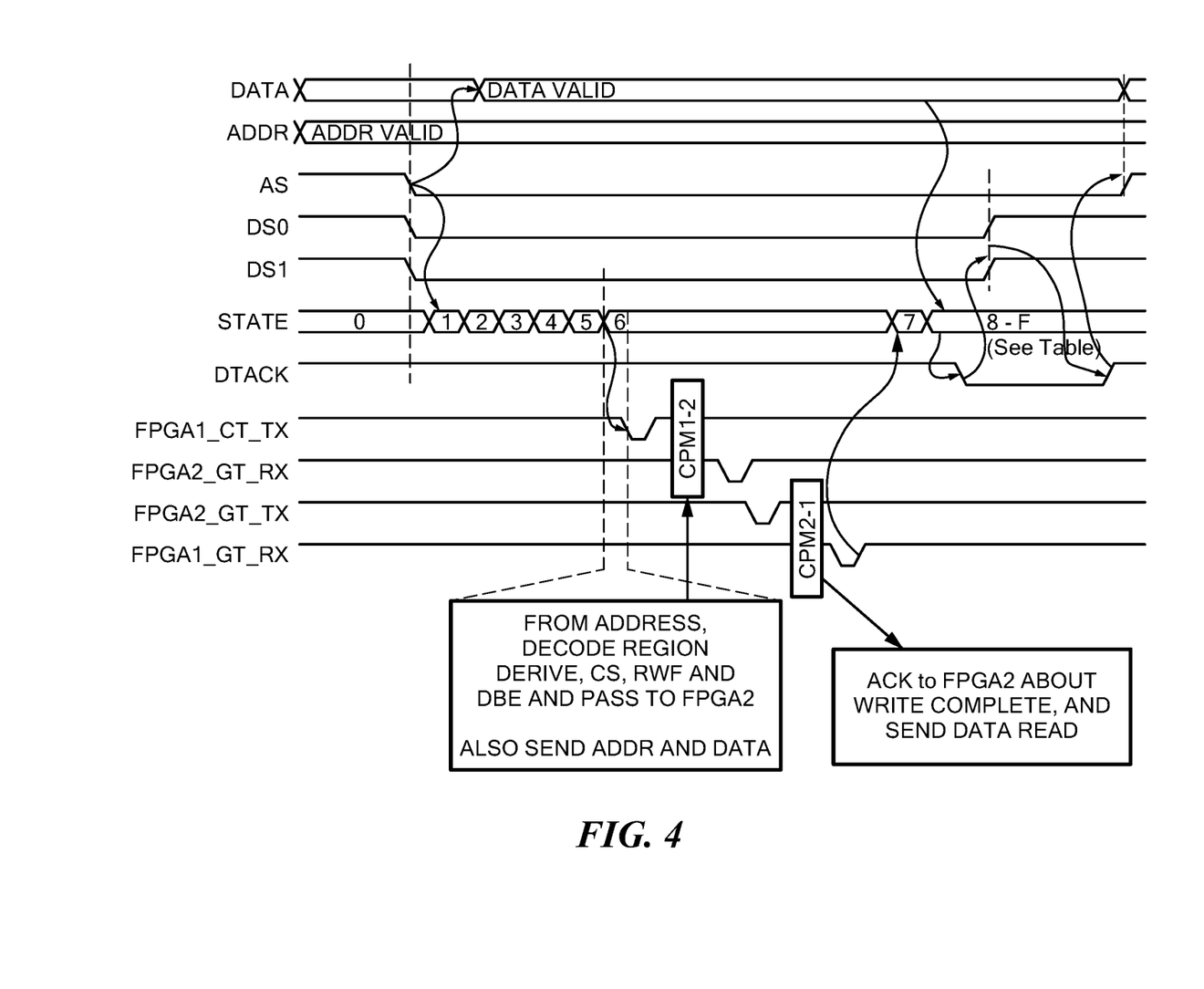
FIG. 4 is a timing diagram for a transaction in the system of FIG. 2.

FIG. 4 shows an example timing diagram for a VME-based bus protocol and FPGA-to-FPGA serial implementation, such as for the system 200 of FIG. 2. As described above, legacy functionality in the first FPGA 202 is handled by the VME bus 206 and legacy functionality in the second FPGA 204 is handled via VME bus 206 and serial communication between the first and second FPGAs. In embodiments, accessing the second FPGA 204 is transparent to the legacy application software and no addressing scheme changes are needed.

As in a typical VME transaction, the DATA, ADDR, AS, DS0, DS1, and DTACK signals operate as usual. The processing states are modified to implement the serial FPGA-to-FPGA communication transparently to the legacy application software. It is understood that the first FPGA 202, which can be referred to as FPGA1, is connected to the VME bus and the second FPGA 204, which can be referred to as FPGA2, is not connected to the bus and is connected to the first FPGA 202 via a serial connection, RX indicates receive, TX indicates transmit, and GT refers to a XILINX interface configuration.

While certain terms may refer to a particular FPGA type or FPGA manufacturer, it is understood use of such terms is intended to facilitate an understanding of embodiments of the disclosure and should not be construed as limiting the scope of the claims in any way.

At state 6, the address is decoded to determine if the second FPGA 204 should be accessed. As noted above, in a legacy system the legacy application accesses a single FPGA which is portioned into first and second FPGAs 202, 204 in a redesign. An access to functionality in the second FPGA 204 by the legacy application can be determined from the address on the ADDR lines on the VME bus. Addresses can refer to first FPGA 202 or the second FPGA 204.

If an access to the second FPGA 204 is initiated, in state 6 a FPGA1_GT_TX signal is activated. In embodiments, chip select CS, read/write flag RWF, data byte enable DBE, etc., signals can be derived by the first FPGA 202 and sent to the second FPGA 204 to enable translation for the serial interface. The data DATA and address ADDR information is sent from the first FPGA 202 to the second FPGA 204 via the serial interface 208. The second FPGA can activate an acknowledgment signal FPGA2_GT_RX for the first FPGA 202 when the write is complete and activate a FPGA2_GT_TX to a data read. Once the first FPGA 202 activates a FPGA1_GT_RX signal processing continues to the next state shown as state 7. In state 8, the VME bus signal operate in the usual way as the legacy "VME" access to the second FPGA 204 is performed and completed by the serial interface 208. Example state processing is shown in FIG. 6.

Figure 5:
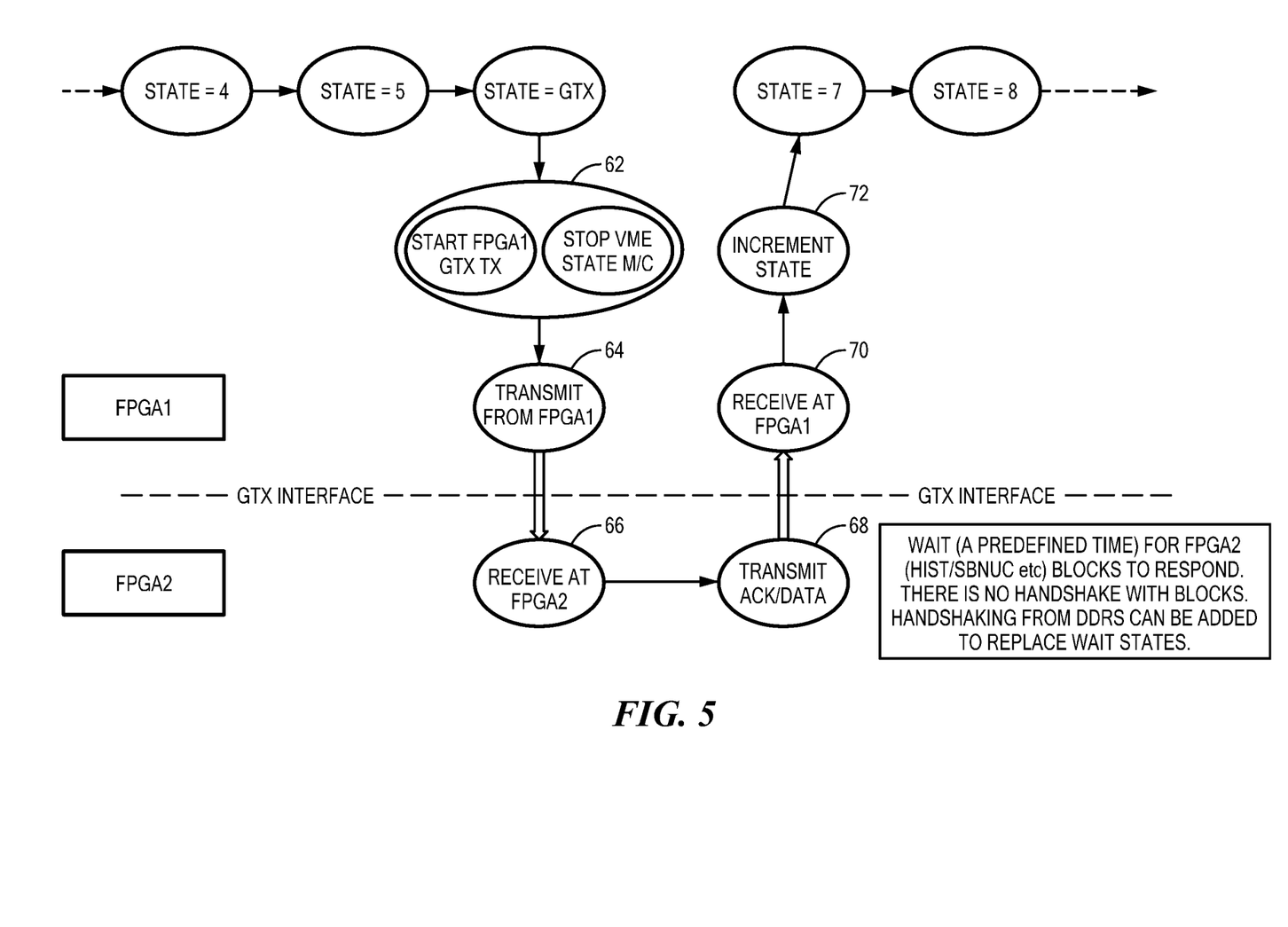
FIG. 5 is a state diagram for a transaction in the system of FIG. 2.

FIG. 5 shows an example state diagram which may correspond to the states in the transaction of FIG. 4. In state GTX (state 6 in FIG. 4), the address on the parallel address bus ADDR is decoded and determined to require access to a second FPGA, e.g., the second FPGA 204 of FIG. 2, which is not connected to the parallel bus. In state 62, VME processing is terminated and GTX processing begins. As noted above, while GTX may refer to a specific type of FPGA to facilitate an understanding of embodiments of the disclosure, it is understood that the scope of claims should be construed broadly and without limitation to any particular type of FPGA, parallel bus, or serial interface.

In state 64, FPGA1, e.g., the first FPGA 202 in FIG. 2, transmits signals, data, and address to FPGA2, e.g., the second FPGA 204 in FIG. 2, as is also described in FIG. 4. In embodiments, FPGA1 activates a transmit signal, such as FPGA1_GT_TX in FIG. 4 as part of the transfer to FPGA2. In state 66, FPGA2 receives the information from FPGA1 and generates a receipt signal, such as FPGA2_GT_RX in FIG. 4. In state 68, FPGA2 generates an acknowledge signal, such as FPGA2_GT_TX in FIG. 4. In step 70, FPGA1 generates a message received signal, such as FPGA1_GT_RX in FIG. 4. In step 72, the state can be incremented and processing continues.

Figure 6:
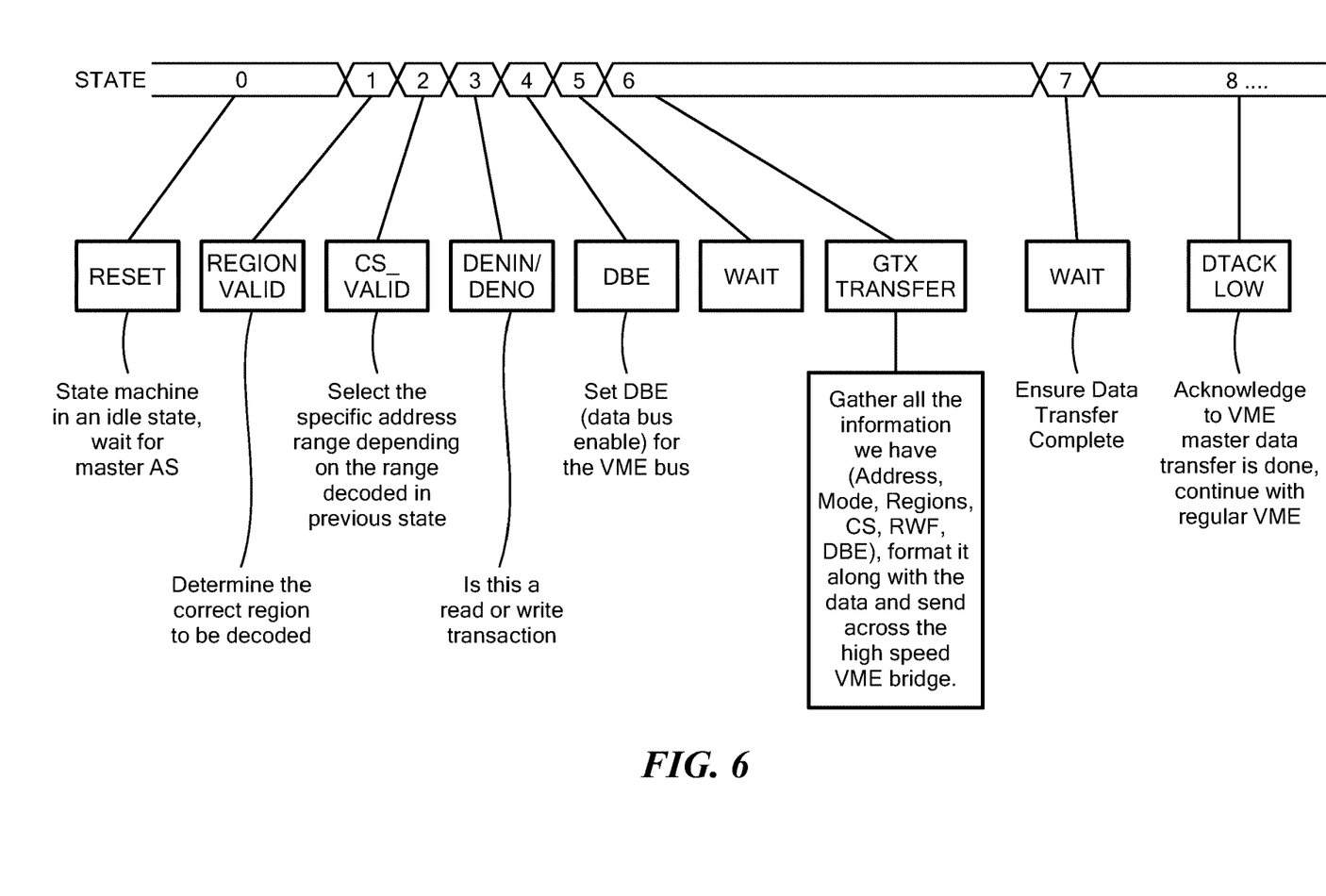
FIG. 6 shows example processing for states in the state diagram of FIG. 5.
Figure 7:
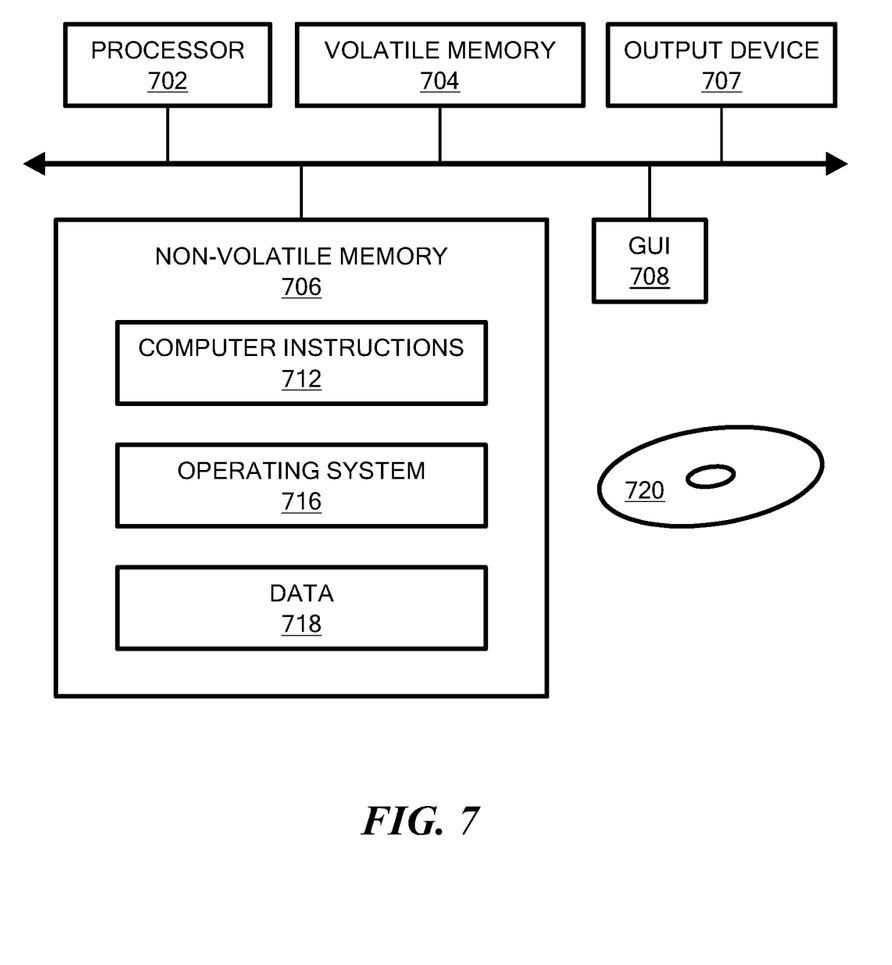
FIG. 7 is a schematic representation of an example computer that can perform at least a portion of the processing described herein.

FIG. 7 shows example processing that can be performed in the states shown in FIGS. 5 and 6. In state 0, reset is performed followed by an idle state until an address strobe signal is received. In state 1, based on the address on the address bus ADDR, a valid region is decoded to determine the correct region to encode. In step 2, a CS_VALID signal can be asserted after selecting a specific address range depending upon the range decoded in state 1. In state 3, it is determined whether a transaction is a read or write operation. In state 4, a data bus enable (DBE) signal is asserted for the VME bus, for example. State 5 is WAIT state. State 6 is a transfer state in which information, e.g., data, address and control signals, for the transfer is gathered and transmitted via the serial interface. In state 7, the system waits until the data transfer is complete. In state 8, an acknowledgment is sent to the bus master that the serial transfer is complete.

FIG. 7 shows an exemplary computer 700 that can perform at least part of the processing described herein. For example, the computer 700 can perform processing to generate signals for a bus controller and/or form a part of a FPGA with a processor for processing shown in FIGS. 2, 4, and 5. The computer 700 includes a processor 702, a volatile memory 704, a non-volatile memory 706 (e.g., hard disk), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub-combination. Other embodiments not specifically described herein are also within the scope of the following claims.

What is claimed is:
1. A method, comprising:
connecting a first FPGA to a parallel bus;

connecting a second FPGA to the first FPGA via a serial interface, wherein the second FPGA is not connected to the parallel bus;

processing, by the first FPGA, a transaction request to the second FPGA by an initiator, wherein the transaction request has a format in a protocol for the parallel bus;

converting the transaction request to the second FPGA into a transaction on the serial interface between the first and second FPGAs; and responding, by the first FPGA, to the initiator via the parallel bus indicating that the transaction request in the format for the parallel bus to the second FPGA is complete, wherein the initiator comprises a legacy application, and wherein the first and second FPGAs are partitioned from a legacy FPGA.

2. The method according to claim 1, wherein the legacy FPGA was configured to connect with the parallel bus.

3. The method according to claim 1, wherein processing, by the first FPGA, the transaction request comprises decoding address information on the parallel data bus.

4. The method according to claim 1, wherein converting the transaction request to the second FPGA into the transaction on the serial interface between the first and second FPGAs comprises:

the first FPGA sending a transmit request signal;
the second FPGA sending a receive indicator signal;
the second FPGA transmitting an acknowledgment signal; and
the first FPGA sending a receive indicator signal.

5. The method according to claim 1, wherein the processing and the converting of the transaction request are performed in a processing state of the parallel bus protocol.

6. The method according to claim 1, wherein the parallel bus protocol comprises VME, PCI, Compact PCI (cPCI), Multibus or any parallel processor bus.

7. A system, comprising:

a first FPGA connected to a parallel bus;
a second FPGA connected to the first FPGA via a serial interface, wherein the second FPGA is not connected to the parallel bus;
wherein the first FPGA is configured to process a transaction request to the second FPGA by an initiator, wherein the transaction request has a format in a protocol for the parallel bus,
wherein the first and second FPGAs are configured to convert the transaction request to the second FPGA into a transaction on the serial interface between the first and second FPGAs, and
wherein the first FPGA is further configured to respond to the initiator via the parallel bus indicating that the transaction request in the format for the parallel bus to the second FPGA is complete.

8. The system according to claim 7, wherein the initiator comprises a legacy application.

9. The system according to claim 7, wherein processing the transaction request comprises decoding address information on the parallel data bus.

10. The system according to claim 7, wherein converting the transaction request to the second FPGA into the transaction on the serial interface between the first and second FPGAs comprises:

the first FPGA sending a transmit request signal;
the second FPGA sending a receive indicator signal;
the second FPGA transmitting an acknowledgment signal; and
the first FPGA sending a receive indicator signal.

11. The system according to claim 7, wherein the processing and the converting of the transaction request are performed in a processing state of the parallel bus protocol.

12. The system according to claim 7, wherein the parallel bus protocol comprises VME, PCI, Compact PCI (cPCI), Multibus or any parallel processor bus.

13. A system, comprising:

a first FPGA connected to a parallel bus;
a second FPGA connected to the first FPGA via a serial interface, wherein the second FPGA is not connected to the parallel bus;
wherein the first FPGA is configured to process a transaction request to the second FPGA by an initiator, wherein the transaction request has a format in a protocol for the parallel bus,
wherein the first and second FPGAs are configured to convert the transaction request to the second FPGA into a transaction on the serial interface between the first and second FPGAs, and
wherein the first FPGA is further configured to respond to the initiator via the parallel bus indicating that the transaction request in the format for the parallel bus to the second FPGA is complete,
wherein the initiator comprises a legacy application, and wherein the first and second FPGAs are partitioned from a legacy FPGA.

14. The system according to claim 13, wherein the legacy FPGA was configured to connect with the parallel bus.

* * * * *